(12) United States Patent
Tremblay (10) Patent No.: US 8,165,887 B2
(45) Date of Patent: Apr. 24, 2012

(54) DATA-DRIVEN VOICE USER INTERFACE

(75) Inventor: Réal Tremblay, Outremont (CA)

(73) Assignee: Nuance Communications, Inc., Burlington, MA (US)

( * ) Notice: Subject to any disclaimer, the term of this patent is extended or adjusted under 35 U.S.C. 154(b) by 618 days.

(21) Appl. No.: 12/330,014

(22) Filed: Dec. 8, 2008

(65) Prior Publication Data

US 2010/0145710 A1    Jun. 10, 2010

(51) Int. Cl.
*G10L 15/22* (2006.01)
(52) U.S. Cl. ......................................... 704/275
(58) Field of Classification Search .................... 704/275
See application file for complete search history.

(56) References Cited

U.S. PATENT DOCUMENTS

| | | | | |
|---|---|---|---|---|
| 6,035,039 A | * | 3/2000 | Tisdale et al. | 380/249 |
| 6,796,492 B1 | * | 9/2004 | Gatto | 235/379 |
| 7,197,460 B1 | * | 3/2007 | Gupta et al. | 704/270.1 |
| 7,451,084 B2 | * | 11/2008 | Funakura | 704/235 |
| 7,519,558 B2 | * | 4/2009 | Ballard et al. | 705/50 |
| 7,624,007 B2 | * | 11/2009 | Bennett | 704/9 |
| 7,647,225 B2 | * | 1/2010 | Bennett et al. | 704/251 |
| 7,657,424 B2 | * | 2/2010 | Bennett | 704/9 |
| 7,698,131 B2 | * | 4/2010 | Bennett | 704/215 |
| 7,702,508 B2 | * | 4/2010 | Bennett | 704/257 |
| 7,725,307 B2 | * | 5/2010 | Bennett | 704/9 |
| 7,725,320 B2 | * | 5/2010 | Bennett | 704/255 |
| 7,729,904 B2 | * | 6/2010 | Bennett | 704/215 |
| 7,831,426 B2 | * | 11/2010 | Bennett | 704/252 |
| 7,869,998 B1 | * | 1/2011 | Di Fabbrizio et al. | 704/251 |
| 7,873,519 B2 | * | 1/2011 | Bennett | 704/257 |
| 7,912,702 B2 | * | 3/2011 | Bennett | 704/9 |

* cited by examiner

*Primary Examiner* — Susan McFadden
(74) *Attorney, Agent, or Firm* — Sunstein Kann Murphy & Timbers LLP (57) ABSTRACT

A method for developing a voice user interface for a statistical semantic system is described. A set of semantic meanings is defined that reflect semantic classification of a user input dialog. Then, a set of speech dialog prompts is automatically developed from an annotated transcription corpus for directing user inputs to corresponding final semantic meanings. The statistical semantic system may be a call routing application where the semantic meanings are call routing destinations.

24 Claims, 4 Drawing Sheets

FIG. 1

(PRIOR ART)

DATA-DRIVEN VOICE USER INTERFACE

FIELD OF THE INVENTION

The present invention relates to a voice user interface for use in human-machine dialogue computer applications such as call routing applications.

BACKGROUND ART

Spoken language understanding systems have been deployed in numerous applications which require some sort of interaction between humans and machines. Most of the time, the interaction is controlled by a Voice User Interface (VUI) where the system asks questions of the users and then attempts to identify the intended meaning from their answers (expressed in natural language) and take actions in response to these extracted meanings. One important class of VUI applications employs Natural Language Understanding (NLU) technology to extract the semantics content of the user queries using statistical methods. We will call such applications statistical semantic systems. One important class of statistical semantic systems known as "call routing" are built to semantically classify a telephone query from a customer to route it to the appropriate set of service agents based on a brief spoken description of the customer's reason for the call. Call routing systems reduce queue time and call duration, thereby saving money and improving customer satisfaction by promptly connecting the customer to the right service representative in large call centers.

Before it can be used, statistical semantic systems first must be trained. Training requires the transcription and semantic annotation of many sample user inputs. For call routing, these user inputs are answers to an open prompt (such as: How may I help you?) at a call center main number. The human annotation of each user input with a semantic tag or meaning is referred to as tagging. In the call routing context, this semantic meaning is simply a call destination (corresponding either to an operator pool or another application), so, in this context, the terms "semantic meaning" and "call destination" can be used interchangeably. The set of transcribed and tagged requests is referred to as the training corpus.

Another example of a statistical semantic system that is not a call routing application would be a voice driven cell phone help application. Examples of annotated meaning could be [functionality: contacts] [question: How to add a contact], [functionality: contacts] [question: How to call a contact], etc. Some examples of user queries could be How do I call one of my contacts quickly? How do I add my friend info to my list?

Figure 1:
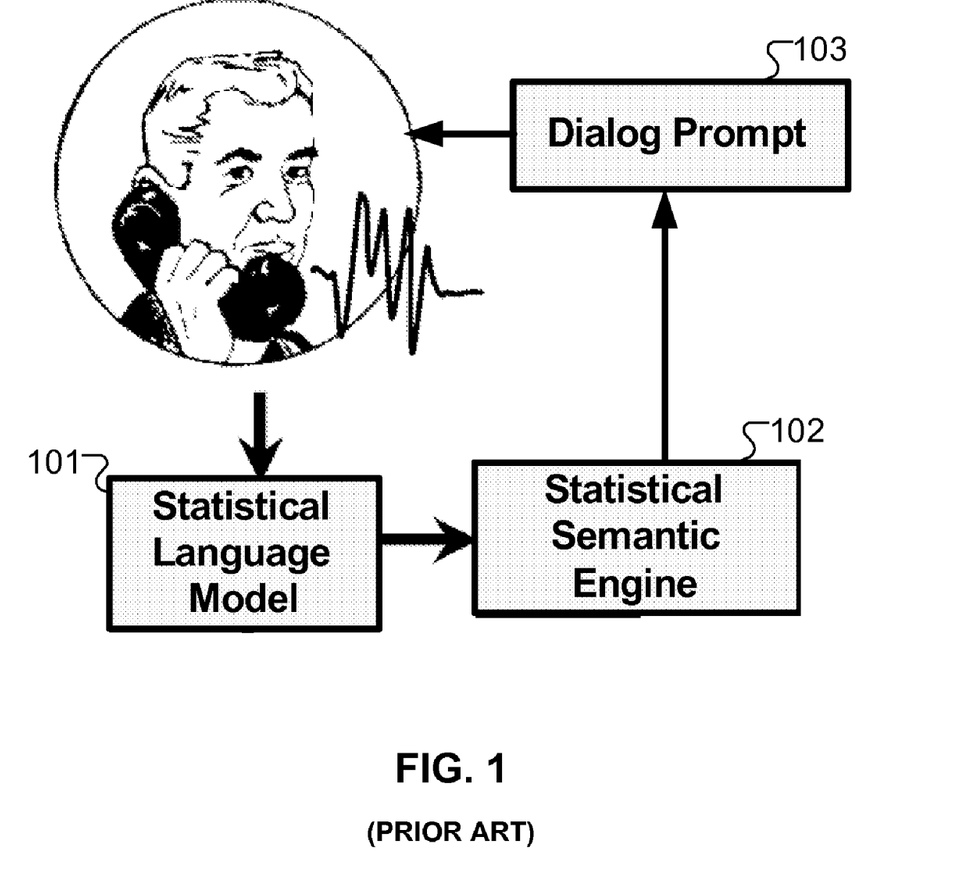
FIG. 1 shows a semantic classification for a user speech input in a statistical semantic system according to the prior art.

FIG. 1 shows a typical statistical semantic system according to the prior art which has a Statistical Language Model (SLM) 101 and a Statistical Semantic Engine (SSE) 102 that are trained on the data in the training corpus. At runtime the SLM 101 receives a speech input from the user and determines the most likely recognized text. The SSE 102 classifies the recognized text with the most probable semantic tags. The SSE 102 also adds for the top returned meanings, a confidence score reflecting the likelihood that its classification is actually correct. The classification of the SSE 102 is used to guide a set of Dialog Prompts 103 that guide the user from an initial open prompt (e.g., How may I help you?) to a state where some actions can be taken, referred to as the final action of the understanding dialog. In call routing, this will be guiding the user from to an initial open prompt to a final destination. For the cell phone help example, it would be guiding the user from an initial open prompt to an unambiguous question for which we can play the instructions.

In current deployed applications, the tagged corpus is used just for training the SLM 101 and SSM 102 but the Dialog Prompts 103 still have to built by hand. This includes crafting confirmation prompts for each of the possible semantic meaning and designing the back-off dialog and the disambiguation dialogs. Grammars also need to be written for all the prompts.

A confirmation prompt is used when the confidence score is above a confirmation threshold and below an acceptance threshold. A confirmation prompt is needed for each semantic meaning.

A back-off dialog is used when the confidence score is below the confirmation threshold or when the confirmation fails. It is based on presenting the customer with a few choices in a hierarchical menu; for example, in the call routing context: Are you calling about e-mail, internet browser, connection problems, etc. Then if the user answers: "e-mail," the next prompt could be: Is this for a password problem or reset, sending or receiving mail problem, etc. For our cell phone help example, the back-off, could be: Is your question related to messaging, ring tones, text messaging, etc.

Disambiguation dialogs are needed for each disambiguation semantic meaning, which is a semantic meaning that does not have enough information to convey the final action and represents a concept regrouping of multiple meanings needed for the taken the final action. Conversely the meanings, for which one can take the final action will be call final meanings. For example, in the call routing context, when a user says "voice-mail" (i.e. destination VoiceMail then most likely the application needs to ask an additional question for getting to a final destination (that might be one the following VoiceMailHelp, VoiceMailHelpPassword, VoiceMailCancel, VoiceMailAdd). For our cell phone help example, when a user says "contact list" (with meaning [functionality: contacts]), then most likely the application needs to ask an additional question for getting to a final meanings (that might be one the following [functionality: contacts] [question: How to add a contact], [functionality: contacts] [question: How to call a contact], [functionality: contacts] [question: How to display], etc.).

But it is not particularly easy to create the prompts and dialogs. It takes significant time and expense for a VUI expert and a speech expert to craft the confirmation, back-off and disambiguation prompts and design grammars to cover possible user inputs. The prompts and grammars are, in general, application specific and cannot be easily reused in another application. Moreover, the prompts are not very precise. Since many different customer requests are pooled together in the same semantic meanings, a confirmation prompt could sound strange and elicit a false confirmation. For example, the user says: I want a new channel. And the confirmation prompt is: I think I understood . . . You'd like to make some kind of change to your service or your account . . . Is that right?

Moreover, until now, the overall number of statistical semantic system application and more precisely call routing applications brought to market has not been high. As a result, each individual application has been a highly customized hand-crafted product much like the first automobiles were a hundred years ago. In marketing terms, the time to market (TTM) and total cost of ownership (TCO) are simply too high. That is, the existing processes for developing those applications are too expensive and therefore exclude many potential customers who need a less expensive product that is more standardized and "off-the-shelf." In the case of call routing applications, it is the application design—writing dialog prompts and grammars—which require the bulk of the time and costs in developing a new product.

However, many of the companies that provide statistical semantic system or call routing applications have relatively few products deployed, and therefore are not at a stage in their business where significant cost-time reductions are needed in developing their call routing products. Moreover, in the case of relatively large companies that provide those products, their internal corporate structure is often highly complicated and their may be little direct communication between Professional Services personnel and those in Research and Development who may therefore be unaware that there are any problems of interest in this area.

SUMMARY OF THE INVENTION

Embodiments of the present invention are directed to using the annotated training corpus for automatically creating an improved Voice User Interface (VUI) for a statistical semantic system. A set of semantic meanings is defined that reflect semantic classification of a user input dialog. Then, a set of speech dialog prompts is automatically developed from an annotated transcription corpus for directing user inputs to corresponding final semantic meanings. In some specific embodiments, the statistical semantic system may be a call routing application so that the semantic meanings are call routing destinations and the final semantic meanings are the final call routing destination.

The speech dialog prompts may include confirmation prompts for confirming semantic meaning in a given user input, back-off prompts for reprompting a given user input, and/or disambiguation prompts for intermediate concept classification of a given user input. The annotated transcription corpus may be a training corpus used for training one or more semantic classification processes associated with directing user inputs.

A specific embodiment may automatically develop the speech dialog prompts by developing a set of data archetypes from the annotated transcription corpus where each data archetype represents one or more annotated transcription samples that are determined to be structurally and semantically similar. A set of semantic meaning archetypes is then developed by associating one or more of the data archetypes with each semantic meaning. Dialog prompts can then be automatically developed for a current user input based on a determination of a best matching semantic meaning archetype for the current user input.

In addition or alternatively, some or all of the speech dialog prompts may be developed by extracting from the annotated transcription corpus one or more semantic meaning informative keywords associated with one or more of the semantic meanings, and then dynamically developing a dialog prompt for a current user input based on the extracted keywords.

Embodiments of the present invention also include a computer program product in a computer readable storage medium for developing a voice user interface for a statistical semantic system according to any of the above. The computer program product includes program code for defining a set of semantic meanings that reflect semantic classification of a user input dialog, and program code for automatically developing from an annotated transcription corpus a set of speech dialog prompts for directing user inputs to corresponding final semantic meanings.

Embodiments of the present invention also include a system for developing a voice user interface for a statistical semantic system according to any of the above. The system includes means for defining a set of semantic meanings that reflect semantic classification of a user input dialog, and means for automatically developing from an annotated transcription corpus a set of speech dialog prompts for directing user inputs to corresponding final semantic meanings.

In some embodiments, an annotated corpus may be utilized for automating the confirmation, disambiguation and back-off prompts for a voice user interface of a speech application even when there is no statistical semantic extraction per se. For example, an application could be developed using a rule based system to extract the information, and such systems do not require an annotated corpus. But it may still be useful to create an annotated corpus and use it to automate the confirmation, disambiguation and back-off prompts of the voice user interface. The annotated corpus can also be created for different reasons than for training of the system. For example, an annotated corpus could be created to test the system and compare human annotated samples with whatever meaning extraction method is used.

DETAILED DESCRIPTION OF SPECIFIC EMBODIMENTS

The need for dialog automation is not fully apparent until a relatively large number of statistical semantic systems and call routing applications have been developed and deployed. Then, if the Research and Development personnel and those in Professional Services regularly work together and communicate with each other, they may cooperate to compile and contemplate various cost and time data associated with developing typical of statistical semantic systems and call routing applications.

Embodiments of the present invention are based on the idea of re-using the annotated training corpus for automatically creating an improved Voice User Interface (VUI) for a statistical semantic system. This means automatically generating the dialog prompts: confirmation prompts for confirming semantic meaning in a given user input, back-off prompts for reprompting a given user input, and disambiguation prompts for intermediate concept classification of a given user input. This approach is generic and not task-dependent. In addition, the dialog prompts can be more accurate and the automation rate is higher because similar examples of real user inputs are used for confirmation and the back-off strategy is more open to interact with users in their own words. Also no significant grammar writing is needed because the SSE is reused through out the application and only a simple automatic grammar is required.

Thus, embodiments of the present invention are based on the insight that the considerable time and effort invested in transcribing and annotating the training corpus used to train the Statistical Language Model (SLM) and Statistical Semantic Engine (SSE) can be more fully exploited. There has been little if any appreciation that the annotated samples in the training corpus can also serve as examples on which to base the various dialog prompts needed by the application. Significant application-specific information is contained in the training corpus and not reusing it means losing that information.

Figure 2:
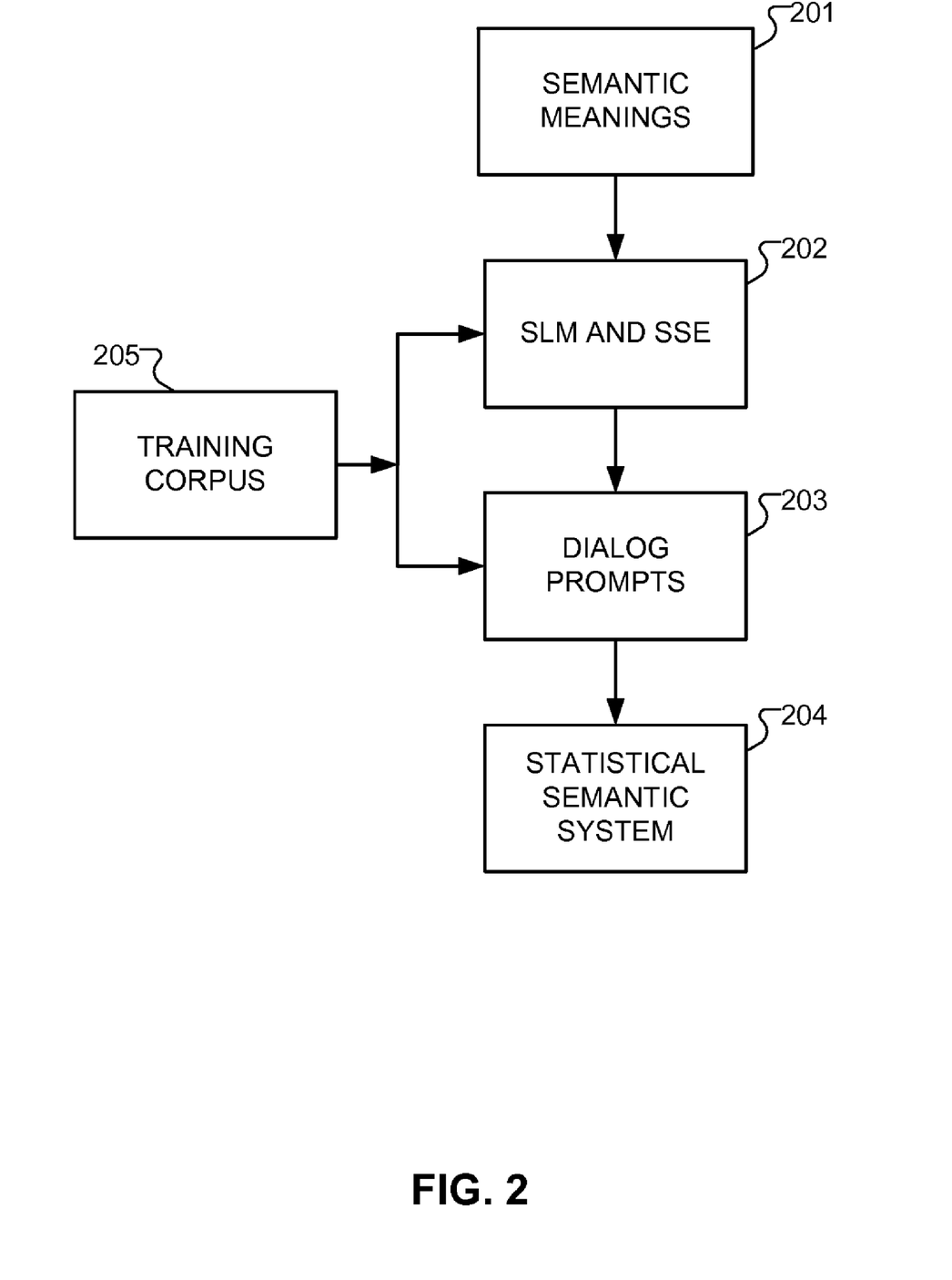
FIG. 2 shows various functional elements in developing a voice user interface for a statistical semantic system according to an embodiment of the present invention.

FIG. 2 shows various functional blocks in an embodiment where the first step is to define a set of semantic meanings (or destinations in a call routing context) 201 that reflect the semantic classification of user speech inputs. The Statistical Language Model (SLM) and Statistical Semantic Engine (SSE) 202 are trained on the tagged transcription samples in the training corpus 205. Then the training corpus 205 is reused to automatically develop a set of speech dialog prompts 203 for directing user inputs to corresponding final semantic meaning (or destinations in a call routing context) 201, thereby forming the completed applications 204.

Figure 3:
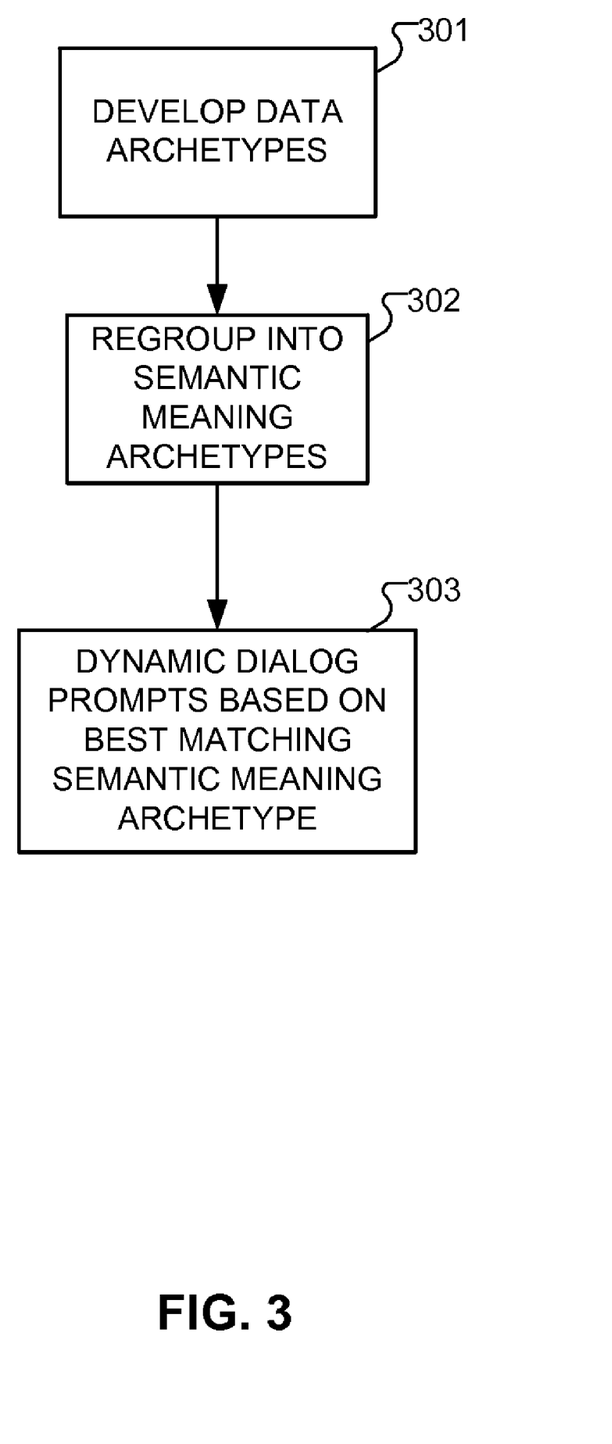
FIG. 3 shows functional steps in developing dialog prompts based on semantic meaning archetypes.

One specific approach for developing the speech dialog prompts by can be thought of as data-driven confirmation prompts (or "FAQ metaphor" prompting). As shown in FIG. 3, a set of data archetypes can be developed from the annotated transcription corpus, block 301, where each data archetype represents one or more annotated transcription samples that are determined to be structurally and semantically similar. All the samples that are similar are put together and a count for each unique tagged transcription is generated. "Similar" can mean strict string equality, or a softer string equality where some unimportant words such as hesitations are removed and some synonym are considered the same (e.g., I wanna, I would like, etc.)

The unique annotated transcriptions may then be sorted by their counts do determine some number N top unique annotated transcriptions, which are kept, and referred to as data archetypes. The number of data archetypes that are needed depends on the number of semantic meanings and the total number of samples in the training corpus. For example, in one set of call routing experiments, about 2,000 data archetypes were kept for ~50,000 tagged samples in the training corpus and ~50 call routes. The important thing for N is to make sure that the count of the retained unique samples are is greater than one.

One property of the data archetypes is that they are well-constructed sentences because phrase fragments with invalid syntax, false starts, etc. are rarely consistent (and therefore rarely found in repeated sentences). For example, for the experimental data set, the top ten data archetypes were:

I'd like to pay my bill
Pay my bill
Upgrade my cable service
Billing
My bill
Technical support
New service
Pay bill
Payment arrangement Even when one looks further down the list in the sentences repeated three times, they are still quite well-constructed:

cable tv service
on_demand problems
international long distance . . .

From the data archetypes, a set of semantic meaning archetypes is developed by associating one or more of the data archetypes with each semantic meaning, simply by looking up their associated semantic meaning, block 302. In the specific case of a call routing application, the semantic meaning archetypes will be destination archetypes. Dialog prompts can then be automatically developed for a current user input based on a determination of a best matching semantic meaning archetype for the current user input, block 303. That is, to confirm a given semantic meaning, the user recognized utterance is compared to the semantic meaning archetypes and the best matching semantic archetype is selected.

In one specific embodiment, the matching algorithm may scale the contribution of an utterance word that matches the semantic meaning archetype by the "degree of information on the destinations" of the word. For example, this can be computed by the entropy of the semantic meaning distribution for that word, the maximum posteriori probability of the semantic meaning distribution, or other similar measure. Also high count archetypes may be favored.

In some embodiments, after the best matching semantic meaning destination archetype is determined, a confirmation prompt can be crafted based on the idea of simply using a prompt template to present the semantic meaning destination archetype to the user for confirmation. For example, in a call routing application, for the user input—I want a new channel—the auto generated dialog prompt can be compared to the existing human-crafted dialog prompt:

AUTO-GENERATED DIALOG PROMPT: I have the following user example: to add a new channel. Is this similar to your request?

HUMAN CRAFTED DIALOG PROMPT: I think I understood . . . You'd like to make some kind of change to your service or your account . . . Is that right?

It seems like the auto-generated dialog prompt works better than the human crafted one. In this case, auto-generated prompt template was: "I have the following user example: [archetype] Is this similar to your request?" Of course, other templates can be used.

The matching algorithm can also return a confidence score that reflects how well the best matching semantic meaning archetype matches the user input. This confidence score can then be used (when it is too low for example) to play a semantic meaning general prompt. To get a general semantic meaning prompt, customers could give a general subject for each destination. For example, for the call routing destination EMAIL, the subject could be e-mail and the general prompt could be: "Are you calling about e-mail?"

Such automatic generation of data driven confirmation prompts can be thought of as FAQ metaphor prompting because the semantic meaning archetype and the user input request play similar roles as in the familiar system of a set of Frequently Asked Questions (FAQ) and a new question. This FAQ metaphor can be useful in various ways, for example, for confirming the two top semantic meanings instead of just the first one. Embodiments of the present invention creation of a dialog prompt using the best-matching semantic meaning archetype as in the following prompt: Which of the following examples corresponds best to your request—"I lost my card"—"I want to get a card"—The first one or the second one?

Figure 4:
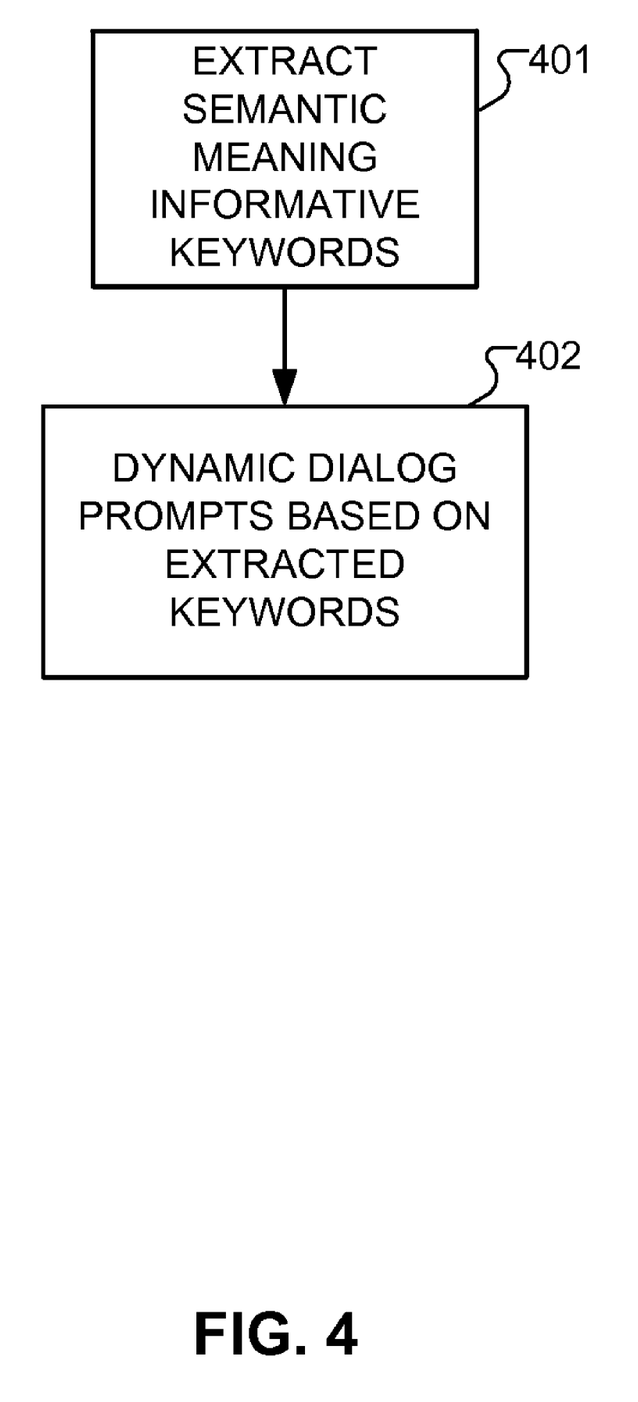
FIG. 4 shows functional steps in developing dialog prompts based on keyword searching.

A different web search (keyword) metaphor approach may be used to generate data driven back-off prompts. As shown in FIG. 4, sentences can be selected from the training corpus from which the most "semantic meaning informative" keywords are extracted, step 401. A dynamic dialog prompt can then be presented to the user based on the extracted keywords, step 402. This data-driven prompting strategy is based on the existing familiarity of many system users with keyword web searches.

In a specific example of such an approach, a set of transcribed samples from the tagged corpus is first selected. There are three situations that can occur:

At the first back-off prompt. For that condition, all the transcribed samples in the training corpus may be selected.

At the second or third back-off prompt. For theses, only the samples containing the previously uttered keywords may be selected. Or alternatively, the samples could be selected in the following manner. The previous uttered words are given as input to the SSE and we keep a list of the returned meanings that have a high confidence score. We then select all the transcribed samples that have a semantic meaning belonging to this list.

A disambiguation prompt, for which, only the samples of the final semantic meaning corresponding to the disambiguation semantic meaning may be selected.

Once the samples to be considered are selected, a simple part of speech (POS) tagger can be run on the training corpus to tag each sample with short noun phrases or verb phrases. These tagging phrases may be just one word, or perhaps a short phrase a few (2-3) words long. Instead of a simple part of speech tagger, another embodiment might use a keyword spotter trained from annotated data (see below). After annotation, the most informative words or short sequences of words are selected. That is, keywords (one word or few words) are selected that provide the most information about the semantic meaning. For example, this can be measured in the entropy reduction between the full meaning distribution and the partial meaning distribution (i.e. of the annotated samples containing the word or sequence of words). A simple threshold also can be applied on the keyword count to discard one or more low runners. The selected keywords could be, for example: e-mail, browser, billing, connection. Note: A POS tagger is one way to group words together based on their part of speech. Another method is to use machine learning techniques to learn potential good keywords from an annotated corpus taken from the same applications or similar applications. For such annotation, a human simply marks potential good keywords (one word or a few words). The features used to train such a tagger could be POS tags of words, counts, word identity, etc.

The first back-off prompt can then be formed with those high runner words or short noun phrase expression. The back-off prompt would present the user with the keyword metaphor, for example:

We are having problems understanding your request. Please provide one or two keywords that better represents the main subject of your call. Examples are e-mail, browser, billing.

In this case, the template for the back-off prompt is: "We are having problems understanding your request. Please provide one or two keywords that better represents the main subject of your call. Examples are [high-runners keywords]." Of course, other prompt templates are possible, for example, the number of keywords presented can be adjusted. Another example template is:

Please help me search with the most appropriate key word or short phrase . . . such as [keywords]

Once, the user input is recognized, it is input to the SSE to obtain the top choice semantic meaning. If the confidence score for the top choice confidence is high enough, processing can stop and the final action corresponding to the final meaning can be taken. In call routing context, the call can be simply routed to the destination. If not, the samples that contain the keyword(s) of the first user input are selected (or by the alternative method described in claim 37) and again dynamically, the most informative words or sequence of words are again determined as described above.

So in an example, if the user's first answer was e-mail, the next dialog prompt may be:

E-mail. Please provide one or additional keywords that better describe your specific problem. Examples are "password, not working, spam"

Again the prompt template is: "[precedent keywords]. Please provide one or two additional keywords that better describe your specific problem. Examples are [high runner keywords]." Other templates are possible, for example:

Can we refine that with another word such as [keywords]?

Once the customer answer is recognized, it is merged with the previous answer to obtain a two-turn query to the SSE. If the confidence score of the top choice is high enough, processing is stopped and the call is routed to that final semantic meaning (i.e. destination in call routing context). If not, the process can be repeated as above, or the call can be redirected to an agent as in existing applications when the fallback dialog fails.

Disambiguation prompts can also be data driven. Initially, the application builder identifies the disambiguation semantic meaning, and data driven disambiguation prompts can then be implemented by entering the Web search metaphor prompting with the given ambiguous user input and associated call routes. For example:

System: How I may help you?
User: Voice-mail

This corresponds to the disambiguation routee, VoiceMail. The web search metaphor algorithm is used to find the best keywords, with the restriction that the destinations considered are only the final semantic meanings that correspond to the disambiguation semantic meaning. So the auto-generated disambiguation prompt might be something like:

Voice-mail. Please provide an additional keyword such as password, help, cancel, register.

Here is the prompt template is: "[precedent keywords or general subject of the disambiguation route]. Please provide an additional keyword such as [Keywords]." Other templates can be used.

In some embodiments, an annotated corpus may be utilized for automating the confirmation, disambiguation and back-off prompts for a voice user interface of a speech application even when there is no statistical semantic extraction per se. For example, an application could be developed using a rule based system to extract the information, and such systems do not require an annotated corpus. But it may still be useful to create an annotated corpus and use it to automate the confirmation, disambiguation and back-off prompts of the voice user interface. The annotated corpus can also be created for different reasons than for training of the system. For example, an annotated corpus could be created to test the system and compare human annotated samples with whatever meaning extraction method is used.

Embodiments of the invention may be implemented in any conventional computer programming language. For example, preferred embodiments may be implemented in a procedural programming language (e.g. "C") or an object oriented programming language (e.g., "C++", Python). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A computer implemented method employing at least one hardware implemented computer processor for developing a voice user interface for a statistical semantic system, the method comprising:
    in a computer process defining a set of semantic meanings that reflect semantic classification of a user input dialog; and
    in a computer process automatically developing from an annotated transcription corpus a set of speech dialog prompts for directing user inputs to corresponding final semantic meanings.

2. A method according to claim 1, wherein the statistical semantic system is a call routing application wherein the semantic meanings are call routing destinations.

3. A method according to claim 1, wherein the speech dialog prompts include one or more confirmation prompts for confirming semantic meaning in a given user input.

4. A method according to claim 1, wherein the speech dialog prompts include one or more back-off prompts for reprompting a given user input.

5. A method according to claim 1, wherein the speech dialog prompts include one or more disambiguation prompts for intermediate concept classification of a given user input.

6. A method according to claim 1, wherein automatically developing a set of speech dialog prompts includes:
    developing a set of data archetypes from the annotated transcription corpus wherein each data archetype represents one or more annotated transcription samples that are determined to be semantically similar;
    developing a set of semantic meaning archetypes by associating one or more of the data archetypes with each semantic meaning; and
    dynamically developing a dialog prompt for a current user input based on a determination of a best matching semantic meaning archetype for the current user input.

7. A method according to claim 1, wherein automatically developing a set of speech dialog prompts includes:
    extracting from the annotated transcription corpus one or more semantic meaning informative keywords associated with one or more of the semantic meanings; and
    dynamically developing a dialog prompt for a current user input based on the extracted keywords.

8. A method according to claim 1, wherein the annotated transcription corpus is a training corpus used for training one or more semantic classification processes associated with directing user inputs.

9. A computer program product in a non-transitory computer readable storage medium for execution on at least one processor of a method of developing a voice user interface for a statistical semantic system, the computer program product having instructions for execution on the at least one processor comprising;
    program code for defining a set of semantic meanings that reflect semantic classification of a user input dialog; and
    program code for automatically developing from an annotated transcription corpus a set of speech dialog prompts for directing user inputs to corresponding final semantic meanings.

10. A product according to claim 9, wherein the statistical semantic system is a call routing application wherein the semantic meanings are call routing destinations.

11. A product according to claim 9, wherein the speech dialog prompts include one or more confirmation prompts for confirming semantic meaning in a given user input.

12. A product according to claim 9, wherein the speech dialog prompts include one or more back-off prompts for reprompting a given user input.

13. A product according to claim 9, wherein the speech dialog prompts include one or more disambiguation prompts for intermediate concept classification of a given user input.

14. A product according to claim 9, wherein the program code for automatically developing a set of speech dialog prompts includes:
    program code for developing a set of data archetypes from the annotated transcription corpus wherein each data archetype represents one or more annotated transcription samples that are determined to be semantically similar;
    program code for developing a set of semantic meaning archetypes by associating one or more of the data archetypes with each semantic meaning; and
    program code for dynamically developing a dialog prompt for a current user input based on a determination of a best matching semantic meaning archetype for the current user input.

15. A product according to claim 9, wherein the program code for automatically developing a set of speech dialog prompts includes:
    program code for developing a set of annotated transcription samples from the annotated transcription corpus by determining for selected annotated transcription samples one or more characteristic keywords associated with one or more of the semantic meanings; and
    program code for dynamically developing a dialog prompt for a current user input based on a determination of a best matching annotated transcription sample for the current user input.

16. A product according to claim 9, wherein the annotated transcription corpus is a training corpus used for training one or more semantic classification processes associated with directing user inputs.

17. A system employing at least one hardware implemented computer processor for developing a voice user interface for a statistical semantic system, the system comprising;
   means for defining a set of semantic meanings that reflect semantic classification of a user input dialog; and
   means for automatically developing from an annotated transcription corpus a set of speech dialog prompts for directing user inputs to corresponding final semantic meanings.

18. A system according to claim 17, wherein the statistical semantic system is a call routing application wherein the semantic meanings are call routing destinations.

19. A system according to claim 17, wherein the speech dialog prompts include one or more confirmation prompts for confirming semantic meaning in a given user input.

20. A system according to claim 17, wherein the speech dialog prompts include one or more back-off prompts for reprompting a given user input.

21. A system according to claim 17, wherein the speech dialog prompts include one or more disambiguation prompts for intermediate concept classification of a given user input.

22. A system according to claim 17, wherein the means for automatically developing a set of speech dialog prompts includes:
   means for developing a set of data archetypes from the annotated transcription corpus wherein each data archetype represents one or more annotated transcription samples that are determined to be semantically similar;
   means for developing a set of semantic meaning archetypes by associating one or more of the data archetypes with each semantic meaning; and
   means for dynamically developing a dialog prompt for a current user input based on a determination of a best matching semantic meaning archetype for the current user input.

23. A system according to claim 17, wherein the means for automatically developing a set of speech dialog prompts includes:
   means for developing a set of annotated transcription samples from the annotated transcription corpus by determining for selected annotated transcription samples one or more characteristic keywords associated with one or more of the semantic meanings; and
   means for dynamically developing a dialog prompt for a current user input based on a determination of a best matching annotated transcription sample for the current user input.

24. A system according to claim 17, wherein the annotated transcription corpus is a training corpus used for training one or more semantic classification processes associated with directing user inputs.

* * * * *